ated polybutadiene as the binder and a reactive burn-rate catalyst selected from 4, 4-diferrocenyl-1-pentanol and 3, 3-diferrocenylbutyl isocyanate are disclosed. The burn-rate catalysts are chemically bound to the binder to prevent migration.

United States Patent [19]
Braun et al.

[11] 3,932,240
[45] Jan. 13, 1976

[54] BURNING RATE MODIFYING BINDER FOR PROPELLANT AND METHOD

[75] Inventors: John D. Braun; Arnold Nielsen; M. Frank Pickett; Ronald Henry, all of China Lake; William P. Norris, Ridgecrest, all of Calif.

[73] Assignee: The United States of America as represented by the Secretary of the Navy, Washington, D.C.

[22] Filed: June 4, 1973

[21] Appl. No.: 367,091

[52] U.S. Cl. ............... 149/19.2; 149/19.9; 149/42; 149/76; 260/439 CY
[51] Int. Cl.² ......................................... C06B 45/10
[58] Field of Search ............. 149/19.2, 19.9, 42, 76; 260/439 CY

[56] References Cited
UNITED STATES PATENTS

| 3,813,304 | 5/1974 | Reed | 149/19.2 |
|---|---|---|---|
| 3,843,426 | 10/1974 | Huskins et al. | 149/19.2 |

Primary Examiner—Stephen J. Lechert, Jr.
Attorney, Agent, or Firm—R. S. Sciascia; Roy Miller; Lloyd E. K. Pohl

[57] ABSTRACT

Solid rocket propellants which utilize hydroxy terminated polybutadiene as the binder and a reactive burn-rate catalyst selected from 4, 4-diferrocenyl-1-pentanol and 3, 3-diferrocenylbutyl isocyanate are disclosed. The burn-rate catalysts are chemically bound to the binder to prevent migration.

4 Claims, No Drawings

3,932,240

BURNING RATE MODIFYING BINDER FOR PROPELLANT AND METHOD

BACKGROUND OF THE INVENTION

1. Field of the Invention

This invention relates to solid rocket propellants which utilize ferrocene derivatives as burn-rate modifiers.

2. Description of the Prior Art

It has been known for many years that various ferrocenyl compounds are potentially good burning rate accelerators for solid rocket propellants. However, because of their tendency to migrate and susceptibility to oxidation, ferrocene derivatives have not found widespread use in solid propellants. For example, liquid n-butyl ferrocene was developed specifically for its processing qualities and then discarded because of its high rate of migration and oxidation susceptibility. The same may be said for other ferrocene derivatives.

To obviate migration problems, various commercial organizations have synthesized large, multi-ferrocenyl molecules in the hopes that the large molecules would entangle with binder molecules and thus be prevented from migrating. However, the use of large molecules has not solved the migration problems as witnessed by the fact that large amounts of iron (in the form of the ferrocenyl compound) appear on the surface of solid propellant grains a short time after preparation even when large molecules are used. Also, the oxidation problems have not been solved by this approach either.

In yet other attempts to obviate migration problems, copolymers containing the ferrocene moiety plus other groups have been made in the hopes that the copolymers could be used as binders. The copolymers are disadvantageous in that they are expensive and difficult to make. Also, they are susceptible to oxidation and usually do not possess very good rubber-like qualities, especially at low temperatures.

In spite of the fact that the problems associated with ferrocenyl compounds have persisted, a considerable amount of work is still going on in the field simply because of the great potential of the compounds.

SUMMARY OF THE INVENTION

It has now been found that the migration and oxidation problems associated with prior art ferrocene derivatives can be largely eliminated with two new ferrocenyl compounds, namely, 4, 4-diferrocenyl-1-pentanol and 3, 3-diferrocenylbutyl isocyanate. It is, accordingly, an objective of this invention to provide solid rocket propellant formulations which include the two above-named compounds. The ferrocene derivatives described herein are either directly chemically bound, or chemically bound through a curing agent, to hydroxy terminated polybutadiene. This prevents migration. the ferrocene derivatives utilized herein do not exhibit high vulnerability to oxidation because they have no hydrogen on the carbon adjacent to the ferrocene group.

DESCRIPTION OF THE PREFERRED EMBODIMENT 4,4-Differocenyl-1-pentanol may be prepared by:

1. reacting ferrocene and methyl levulinate in the presence of an acid such as polyphosphoric acid and a methanol-cyclohexane solvent at a temperature of from 76° to 78°C to produce methyl 4, 4-diferrocenyl-pentanoate; and 2. refluxing the pentanoate with lithium aluminum hydride in tetrahydrofuran and ether to produce the final desired product. 3, 3-Diferrocenylbutyl isocyanate may be prepared by:

1. hydrolyzing methyl 4, 4-differrocenyl-pentanoate with potassium hydroxide to produce 4, 4-diferrocenyl-pentanoic acid;

2. reacting the acid with phosporous trichloride to produce 4, 4-diferrocenyl pentanoyl chloride;

3. reacting the pentanoyl chloride with sodium azide to produce 4, 4-diferrocenylpentanoyl azide; and 4. dissolving the pentanoyl azide in dry benzene and refluxing to produce the final desired product.

A more complete description of the preparation of the two compounds is described in copending U. S. Patent application Ser. No. 238,583 filed Mar. 27, 1972 by Dr. Arnold T. Nielsen.

Both 4, 4-differrocenyl-1-pentanol and 3, 3-diferrocenylbutyl isocyanate are solids and may be incorporated into solid rocket propellants by typical processes. When the pentanol is incorporated into a solid propellant which utilizes a binder such as hydroxy terminated polybutadiene, a diisocyanate curing agent or the like is used as a bridge to react with the hydroxy groups of the pentanol and the hydroxy groups of the polybutadiene, joining the pentanol to the binder. When 3, 3-diferrocenylbutyl isocyanate is used, no curing agent is necessary to attach the ferrocene derivative to the polybutadiene. The isocyanate groups of the ferrocene derivative react directly with the hydroxyl groups of the hydroxy terminated polybutadiene.

The following Example describes a typical process for preparing solid propellants utilizing the two ferrocene derivatives of this invention.

EXAMPLE

Step 1 — Hydroxy terminated polybutadiene prepolymer (R45HT by Arco Chemical Co., functionality = ~2.7) and a desired amount of one of the ferrocene derivatives are added to a mixer. The mixture is then stirred under vacuum for 15–20 minutes. A small amount of antioxidant is added along with the ferrocene derivative. Step 2 — Fuel particles, such as aluminum particles, are added to the contents of the mixer and mixing under vacuum is resumed for 5 to 10 minutes. (All mixing is done under vacuum unless otherwise stated.)

Step 3 — Oxidizer particles, such as a combination of ultra fine ($0.5\mu$) ammonium perchlorate and 5 to $7\mu$ ammonium perchlorate, are added small increments such that the particles can be gradually incorporated into the propellant without severe clumping and loss of flow. Oxidizer is added over a period of 45 minutes or more while stirring is continued.

Step 4 — After all of the oxidizer has been added, mixing is continued for at least one more hour.

Step 5 — A calculated amount of diisocyanate curing agent, such as isophorone diisocyanate, is added and stirred for about 5 minutes.

Step 6 — The mixer is scraped down.

Step 7 — Mixing is resumed for about 10 to 15 minutes. Step 8 — The mixer is scraped down and its contents are cast. A cure time of about 7 days at 140°F is utilized to allow the propellant grain to solidify.

The R45HT prepolymer used in this invention contains an average of approximately 2.7 hydroxy groups per prepolymer chain. The ferrocene derivatives of this invention react, either by themselves or through a curing agent, with nearly 0.7 hydroxy groups. There are then slightly over 2.0 hydroxy groups still available per polybutadiene molecule for the curing of the prepolymer to form the cured propellant binder.

The above-described process calls for ammonium perchlorate oxidizer. However, any other oxidizer whose decomposition or burning can be catalytically accelerated by the presence of finely divided iron (provided by the ferrocene derivative) would be suitable. It will, of course, also be realized that some other equivalent solid fuel material could be used in lieu of the aluminum specified above.

The steps described in the above Example are similar to those of other propellant formulation processes and are suitable for use in this invention. However, it has been found that if, prior to Step 1, the diferrocenylbutyl isocyanate is mixed; in benzene solvent, with hydroxy terminated polybutadiene and allowed to react for about 24 hours at 50° to 60°C, the resulting prepolymer provides both better aging qualities and a higher rate of burn to propellants than where the 3, 3-diferrocenylbutyl isocyanate is added and allowed to react "in situ" in the propellant during mixing and cure.

Propellants utilizing the ferrocene derivatives of this invention contain from about 84 to 88 weight percent solids (fuel and oxidizer) and from about 16 to about 12 weight percent binder (hydroxy terminated polybutadiene, ferrocene derivative, antioxidant and curing agent). Usually 1 to 2 parts by weight of ferrocene derivative will be used for every 11 to 12 parts by weight of hydroxy terminated polybutadiene. Table 1 discloses two examples of typical propellant formulations.

TABLE I

| Mix No.[x] | HTPB[a] + ferrocene derivative | IPDI[b] | AO[c] | Al[d] | UFAP[e] | AP[f] |
|---|---|---|---|---|---|---|
| 41-1-1 | 13.268 | 1.581 | 0.15 | 14.83 | 41.51 | 28.66 |
| 48-1-1 | 13.115 | 0.734 | 0.15 | 15.00 | 42.00 | 29.00 |

[a]HTPB = R45HT hydroxy terminated polybutadiene. (ARCO Chemical Co.)
[b]IPDI = isophorone diisocyanate.
[c]AO = phenolic type antioxidant.
[d]Al = 60 μ aluminum.
[e]UFAP = ultra fine ammonium perchlorate (~0.5μ).
[f]AP = 5–7 μ ammonium perchlorate.
[x]Mix No. 41-1-1 contained 11.636 parts by weight HTPB and 1.632 parts by weight 4, 4-diferrocenyl-1-pentanol. The pentanol was allowed to react in situ in the propellant. Mix No. 48-1-1 contained 11.641 parts by weight HTPB and about 1.474 parts by weight 3, 3-diferrocenylbutyl isocyanate. The HTPB and isocyanate were prereacted in benzene at 60°C for 24 hrs. to form an HTPB/Ferrocene prepolymer which was isolated and used in the propellant.

When the two above-described propellants were compared with a similar one (See 48-2-1 in Table 2) which contained 11.522 weight percent HTPB, 1.559 weight percent of a commercial liquid ferrocene derivative sold under the tradename Hycat-6 by United Technology Corporation, 0.15 parts by weight phenolic antioxidant, 0.767 parts by weight IPDI, 15 parts by weight Al 42 parts by weight UFAP and 29 parts by weight 5–7 μ AP a significantly smaller amount of migration was observed on aging in the propellants which contained the ferrocene derivatives of this invention. On aging 30 days at 140°F., the Hycat propellant developed a hard black surface, indicative of liquid ferrocene migration and oxidation. No such surface developed in propellant containing the two ferrocene derivatives of this invention.

Hydroxy-terminated polybutadiene gumstock (cured unfilled propellant binder) which contained 3, 3-diferrocenylbutyl isocyanate in the same proportion as in propellant was formulated. After 30 days aging in air at 140°F, it was found to contain only about 0.9% more iron (in the form of ferrocene derivative) at the surface than before aging. The interior iron content decreased by the same amount.

On the other hand, gumstock which contained the commercial liquid ferrocene derivative contained nearly 38% more iron at the surface after aging, and the interior contained 38% less iron. The Hycat-6 gumstock had a hard surface after aging, and had lost most of its extensibility. The reactive ferrocene gumstock had no hard surface on aging, and lost on aging only ~6% of the total extensibility it had before aging. The same gumstock without any ferrocene additives also lost only ~6% of its extensibility on aging.

These examples clearly illustrate the greater oxidation and migration resistance of these new reactive ferrocene derivatives.

In still another comparison, the propellants of this invention were found to retain their ability to elongate much better than the propellant which contained the commercial liquid ferrocene derivative. This is shown by the following Table. State-of-the-art R53 propellant with iron oxide burn-rate accelerator is included for comparison.

TABLE II

| Mix No. | $E_{max}$,% before aging[a] | $E_{max}$,% after aging[a] |
|---|---|---|
| 41-1-1 | 18.0 | 13.8 |
| 48-1-1 | 31.6 | 19.7 |
| 42-2-1[b] | 24.9 | 10.1 |
| R53[c] | 36.9 | 26.0 |

[a]aging = 30 days at 140°F. in air.
[b]propellant utilizing the commercial liquid ferrocene compound Hycat-6. (U.T.C. Corp.)
[c]analogous state-of-the-art propellant with 1% iron oxide burning rate accelerator.

The burn rate in inches per second of the 4, 4-diferrocenyl-1-pentanol containing propellant compared favorably to that of the propellant which contained the commercial ferrocene derivative and the burn rate of the propellant which contained 3, 3-diferrocenylbutyl isocyanate showed a significant improvement over that of the propellant which utilized the commercial ferrocene derivative. The burn rates are shown in the following Table.

TABLE III

| Mix No. | Burn Rates, ips | | | | burn rate slope (n) |
|---|---|---|---|---|---|
| | 500 psi | 1000 psi | 2000 psi | 3000 psi | |
| 41-1-1 | 2.063 | 2.611 | 3.496 | 4.211 | 0.43 |
| 48-1-1 | 2.194 | 3.105 | 4.258 | 5.779 | 0.54 |
| 48-2-1 | 1.825 | 2.609 | 3.600 | 4.638 | 0.52 |

TABLE III-continued

| Mix No. | Burn Rates, ips | | | | burn rate slope (n) |
| --- | --- | --- | --- | --- | --- |
| | 500 psi | 1000 psi | 2000 psi | 3000 psi | |
| R53 | 1.395 | 2.015 | 3.026 | 3.879 | 0.59 |

The burning rate slopes of propellants which contain the ferrocene derivatives of this invention fall well within acceptable standards.

The ferrocene derivatives which are chemically attached to hydroxy terminated polybutadiene to prevent migration according to this invention are very resistant to oxidation. It is theorized that this is because there is no hydrogen on the $\alpha$-carbon atom adjacent to the ferrocene group in either 4,4-diferrocenyl-1-pentanol or 3,3-diferrocenylbutyl isocyanate which can be oxidized readily.

What is claimed is:

1. A binder - burn rate modifier system for solid rocket propellants comprising hydroxy terminated polybutadiene with a suitable curative as the binder and a member selected from the group consisting of 4,4-diferrocenyl-1-pentanol and 3,3-diferrocenylbutyl isocyanate as the burn-rate modifier.

2. A binder - burn rate modifier system according to claim 1 wherein the burn rate modifier is 4,4-diferrocenyl-1-pentanol and where the burn rate modifier is chemically attached to the binder by means of a curing agent.

3. A binder - burn rate modifier system according to claim 1 wherein the burn rate modifier is 3,3-diferrocenylbutyl isocyanate and wherein the burn rate modifier is directly chemically attached to the binder.

4. A method for modifying the burn rate of a solid rocket propellant which utilizes hydroxy terminated polybutadiene as the binder, said method comprising the steps of:
   a. adding a ferrocene derivative selected from the group consisting of 4,4-diferrocenyl-1-pentanol and 3,3-diferrocenylbutyl isocyanate to the binder; and
   b. chemically attaching the ferrocene derivative to hydroxy groups of the binder by means of an isocyanate.

* * * * *